United States Patent [19]
Rosenberg

[11] Patent Number: 5,898,758
[45] Date of Patent: Apr. 27, 1999

[54] COMBINATION CELLULAR TELEPHONE AND PAGER APPARATUS

[76] Inventor: Michael Rosenberg, 1521 Johnson Dr., #821, Buffalo Grove, Ill. 60089

[21] Appl. No.: 08/312,786
[22] Filed: Sep. 26, 1994
[51] Int. Cl.⁶ .................................................. H04M 11/00
[52] U.S. Cl. .............................. 379/57; 379/58; 379/433; 455/90
[58] Field of Search ................................. 379/57, 58, 59, 379/61, 368, 433; 455/89, 90

[56] References Cited

U.S. PATENT DOCUMENTS

| | | | |
|---|---|---|---|
| 4,490,579 | 12/1984 | Godoshian | 379/57 X |
| 5,099,507 | 3/1992 | Mukai et al. | 379/57 |
| 5,140,632 | 8/1992 | Anten | 379/58 X |
| 5,148,473 | 9/1992 | Freeland | 379/59 |
| 5,335,273 | 8/1994 | Takagi et al. | 379/433 |
| 5,335,276 | 8/1994 | Thompson et al. | 380/21 |

Primary Examiner—Curtis Kuntz
Assistant Examiner—G. J. Oehling
Attorney, Agent, or Firm—McHale & Slavin, P.A.

[57] ABSTRACT

The instant invention is a paging device which couples to a cellular telephone allowing independent use of the cellular telephone and the paging unit. The paging unit includes a speaker for converting received signals into a dial tone for placement against either a conventional land based telephone or a cellular telephone for automatically redialing of numbers received by the paging unit. The paging unit can be coupled to a compatible cellular telephone wherein the pager and telephone can be carried as a single unit allowing screening of incoming calls and an automatic callback of received paged calls.

2 Claims, 4 Drawing Sheets

COMBINATION CELLULAR TELEPHONE AND PAGER APPARATUS

FIELD OF THE INVENTION

The present invention relates to cellular telephones and paging devices, and in particular to a portable cellular telephone with a detachable pager.

BACKGROUND OF THE INVENTION

The advent of the cellular telephone has provided the consuming public with an enhanced mobility providing a means for remaining in constant communication with friends or business associates. However, despite the popularity of two-way wireless communication as provided by the cellular telephone, a radio frequency receiving unit commonly referred to as a pager remains the most prominent one-way wireless communicator for informing the carrier of the pager that they are being sought out for purposes of communication. The pager has numerous advantages including low cost, compactness, and screening ability that make it the most widely accepted form of communication. Typically the holder of a paging unit would receive a communication directly wherein the paging unit would provide an audio signal that a paging signal has been received, further providing a digital readout of the received message.

A primary advantage of the pager is its ability to allow the holder to screen calls and return them when convenient. For instance, a person attending a meeting could turn the audio sound of the pager off wherein a call could still be received and the holder could review messages at a later time. Improvements to the pager allow many such devices to vibrate so as to signal the holder that a call has been received, thus eliminating the disturbance of an audio signal.

A problem with cellular telephones is their limited battery life requiring recharging approximately every twelve hours. Actual life of the battery is dependant upon how many times the phone is used, for constant use could cause the battery to drain within hours. Alternatively, a major advantage to the pager is its ability to operate in a constant on position for periods exceeding one year.

Further, the cellular telephone requires the user to answer the phone in order to determine who is calling. Thus, the user is charged a fee for the privilege of answering any call, even a wrong call. Should the user simply wait to tell the caller that it is an inappropriate time to talk, the user is still charged a fee. All of which the above consumes valuable battery time.

Thus, combinations of the pager and cellular telephone satisfy numerous situations and it is not uncommon for a telephone company to sell both a pager and a cellular telephone. The consumer would carry both devices and should they receive notice of a call on the pager, they may immediately return the call if deemed important or wait until later if more convenient. The pager operates to screen incoming calls and saves on battery recharging. Both the telephone and the pager can be attached to the consumer's belt.

However, most consumers do not care to dangle multiple electronic devices off of their belt or add to the confines of a purse. Yet what remains is the need for combination pager and cellular telephone.

U.S. Pat. No. 5,148,473 assigned to Motorola discloses a combination pager and cellular telephone. However, the circuitry of the pager is incorporated into the circuitry of two devices wherein a page can be received and automatically transferred to the cellular phone for redialing without the need for re-inputting the received number. The cellular telephone/pager combination utilizes the same antenna and rechargeable battery. Thus, the problem with the device is that the cellular telephone must be carried constantly even if only the paging portion is utilized. For example, one of the major benefits of a pager is its compact size that allows it to be carried in most any instance such as when a consumer is exercising. By use of the Motorola device the individual would have to carry the combination telephone and pager which is cumbersome and not always necessary for the particular response sought.

Thus, what is need in the art is a cellular telephone and pager combination that operates in combination or allows an individual to detach the pager for use in its conventional manner, as well as the telephone to be used in its conventional manner.

SUMMARY OF THE INVENTION

The instant invention combines the benefits of a cellular telephone and pager yet maintains separate operation when necessary. A preferred embodiment of the instant invention discloses a cellular telephone having a key pad cover with an integrated pager which is either pivotally connected or slidably attached to the telephone. The telephone can still be used in its ordinary fashion by exposing the key pad by movement of the cover. Holes through the cover allow voice passage through the pager for pick up by cellular telephone microphone.

Unlike the known prior art, the instant invention does not combine the circuitry of pager with the telephone, and most importantly maintains a separate battery source. Thus, should the battery be exhausted in the cellular telephone the pager remains operable and available for receipt of incoming messages. More importantly, the paging mechanism can be detached from the cellular telephone so as to be carried in a conventional manner such as attachment to a belt or other clothing. When a page is received, the pager can be used in its ordinary manner or attached to the cellular phone wherein an integrated speaker allows for tone transfer of the received page directly to the microphone of the telephone. The tone transfer allows the pager to be used on a conventional land base telephone system.

When it, is desirable to carry the telephone and pager as a combined unit, the pager is attached directly to the phone in such a manner so as to provide protection from accidental contact with the key pad or in an alternative embodiment the pager fits within a slot to conceal the pager. As a combined unit, only a single electronic device need be carried providing the user with control over incoming calls by allowing selectivity over returning calls and saving telephone battery strength for important calls.

In operation, the listed number of the telephone user would be the pager number thus eliminating the cost associated with receiving incoming calls. The pager allows the user to depress a recall button to view a received page and automatically redial the number by depression of a dial button which translates the displayed number into an audio tone by means of conventional tone generation circuitry. This is performed by integration of a speaker within the paging device available to transmit a tone signal to the microphone pick up for transfer between the pager and telephone. Thus, the telephone can be in the off position wherein all calls are received by the pager device. When a page is received, the telephone can be turned on so as to make an outgoing call.

The pager is functional both in combination and separate from the telephone. Once the pager is in its respective compartment on the cellular telephone, the user will be able to review the number via a display screen. As with a conventional pager, the user will be able to scroll through the numbers contained on the pager. Once the desired number is displayed on the screen, the user need simply depress a send button to dial the number.

Thus, an objective of the instant invention is to provide an apparatus having the independent benefits of a cellular telephone and paging device yet eliminate the need for carrying two separate electronic devices.

Yet another objective of the instant invention is to provide a redialing mechanism by teaching a paging device having an integrated speaker for sending touch tones in relation to the received page signal.

Yet another objective of the instant invention is to teach the use of a pager in combination with a telephone to extend the time between recharging and replacement of the telephone battery yet allow the holder of the cellular phone to be reached.

Another objective of the instant invention is to provide a cover for the key pad of a cellular telephone to prevent accidental depression of the keys, especially when the telephone is in use.

Yet still another objective of the instant invention is to allow the consumer to purchase either a cellular telephone or pager independently, allowing the consumer to defer a portion of the electronic purchase yet eventually receive the benefits of a pager and telephone.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Although the invention has been described in terms of various embodiments, it will be readily apparent to those skilled in the art that further modifications, rearrangements and substitutions can be made without departing from the spirit of the invention. The scope of the invention is defined by the claims appended hereto.

Figure 1:
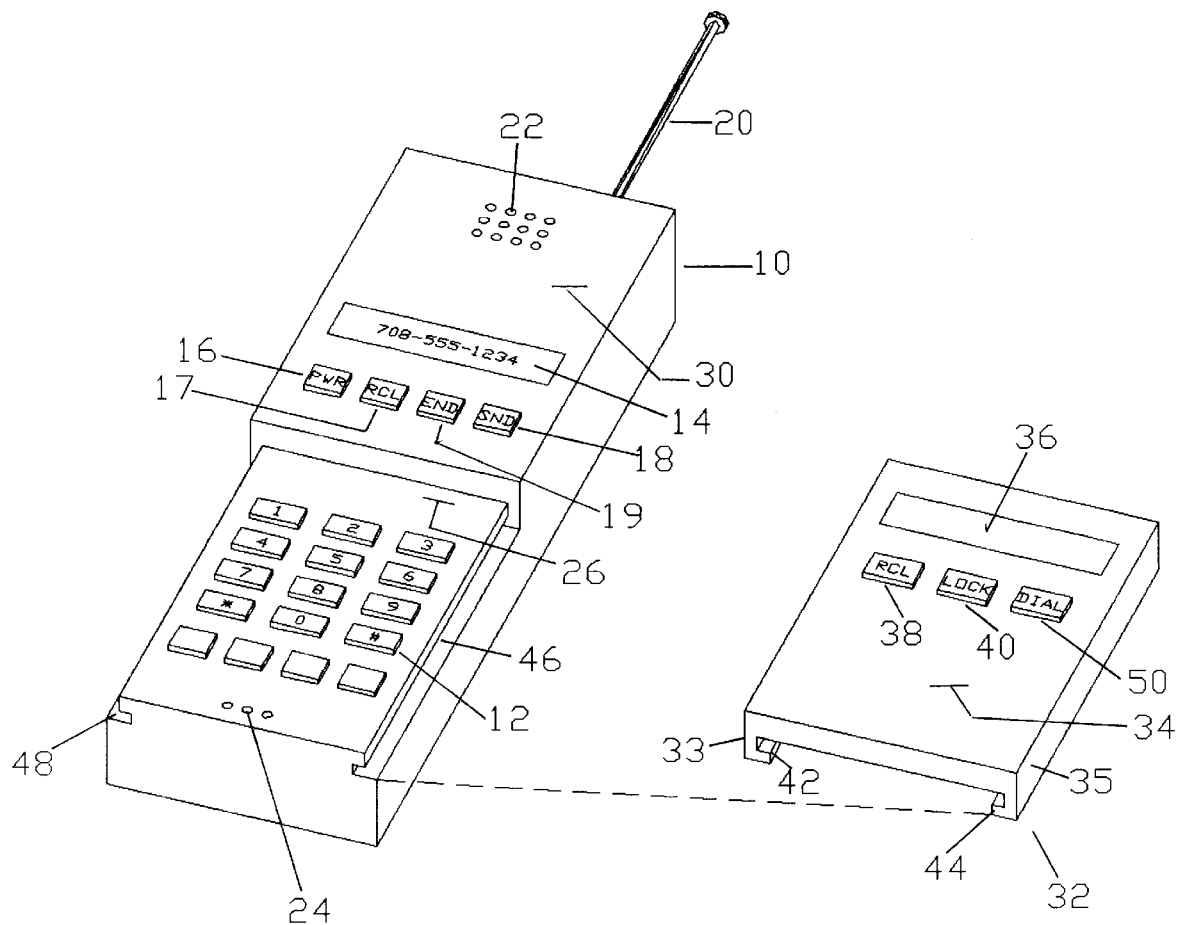
FIG. 1 is a pictorial view of a cellular telephone with a paging unit available for sliding over a key pad of the telephone.

Now referring to FIG. 1 illustrated is a conventional cellular telephone 10 having incorporated the teachings of the instant invention. The telephone is defined by a numerical key pad 12, display screen 14, on-off power switch 16, recall switch 17, send switch 18, and end switch 19. Typical operation of the telephone requires the power switch 16 to be activated which couples a rechargeable battery power source to the telephone circuitry wherein the key pad 12 allows the user to input a telephone number which is verified on the display screen 14. Once the number has been keyed into the phone, the user is required to depresses the send button 18 to complete the coupling to a relay station for connection of the call. As is well known to those skilled in the art, the cellular phone transmits in high speed digital fashion, the phone number information for ultimate receipt by the telephone office to permit interconnection with the telephone network and to a desired party. Once the call is complete, audio connection between the user and desired party is provided for full duplex operation wherein audio output is provided through a speaker located beneath speaker screen 22. Audio input is made through a microphone pickup 24 placed at the bottom of the key pad panel at a position near the users mouth.

The pager 32 assimilates a conventional pager apparatus having basic display and operating functions including a display screen 36, recall button 38, and lock button 40. The shape of the pager 32 is substantially rectangular having a first 33 and second 35 parallel spaced apart sidewalls which depend beneath the bottom surface of the pager 32 a fixed distance. The first sidewall 33 includes a lower edge with an inwardly facing insertion tab 42 forming a mirror image of the second sidewall 35 having a lower edge with inwardly facing insertion tab 44. On each side of the telephone 10 is a slot 46 and 48 extending along a length of the key pad. The pager apparatus 32 can be slidably attached to the telephone 10 by insertion of tab 42 into slot 48 and tab 44 into slot 46 wherein the lower surface of the pager 32 is placed in a fixed position over the key pad 12 to operate as a cover preventing accidental depression of the key pad.

It should be noted that the key pad 12 and key pad surface 26 are disposed in a first plane that is lowered a fixed distance from the display surface 30. The key pad surface 26 allows placement of the cover/pager combination 32 in position over the key pad surface 26 to provide a uniform surface projecting only the critical function keys. In this mode, a call received can be redialed without removal of the pager.

With the pager 32 coupled to the telephone 10, when a page is received it can be displayed on the display screen 36 or stored in the memory for later recall. Upon demand the user would display the number and if they choose to call the number set forth on the display, redial the number by depressing the Dial switch 50 will initiate a series of audio tones corresponding to the displayed numbers through a speaker 51 for pick up by the telephone 10. The speaker 51 (shown in fathom) would line up with and be oriented towards the microphone pick-up 24 of the telephone 10. Thus, the return of a pager signal via the cellular telephone could be expedited upon receipt by first turning on the power switch 16, depressing the recall button to paginate through the various calls received, and depressing the dial button so wherein the tones would be generated by the pager unit into the microphone pick-up 24 wherein the send switch 18 completes the call connection. Once the call has been made and connection completed, the user can speak into holes 52 which are placed directly over the microphone pickup, and listen to audio output through speaker screen 22.

In this mode the pager operates to bypass the need for a keypad thereby preventing the accidental depression of the key pad 12, and set forth an aesthetically pleasing cellular telephone by providing surface area 34 available for placement of logos or the like indicia.

Should the cellular telephone 10 be turned off, the paging device 32 can be removed from the telephone by sliding the pager off the engagement slots 46 and 48 wherein the pager can be used in its conventional fashion for simple receipt of incoming telephone calls. As with a conventional pager, the recall button 38 provides recall of multiple pages. Placement of the paging device 32 over the mouthpiece of a conventional land based telephone provides the pager with the ability for redialing over the telephone system. Lock 40 prevents accidental removal of recalled numbers until the necessary engagement time.

Figure 2:
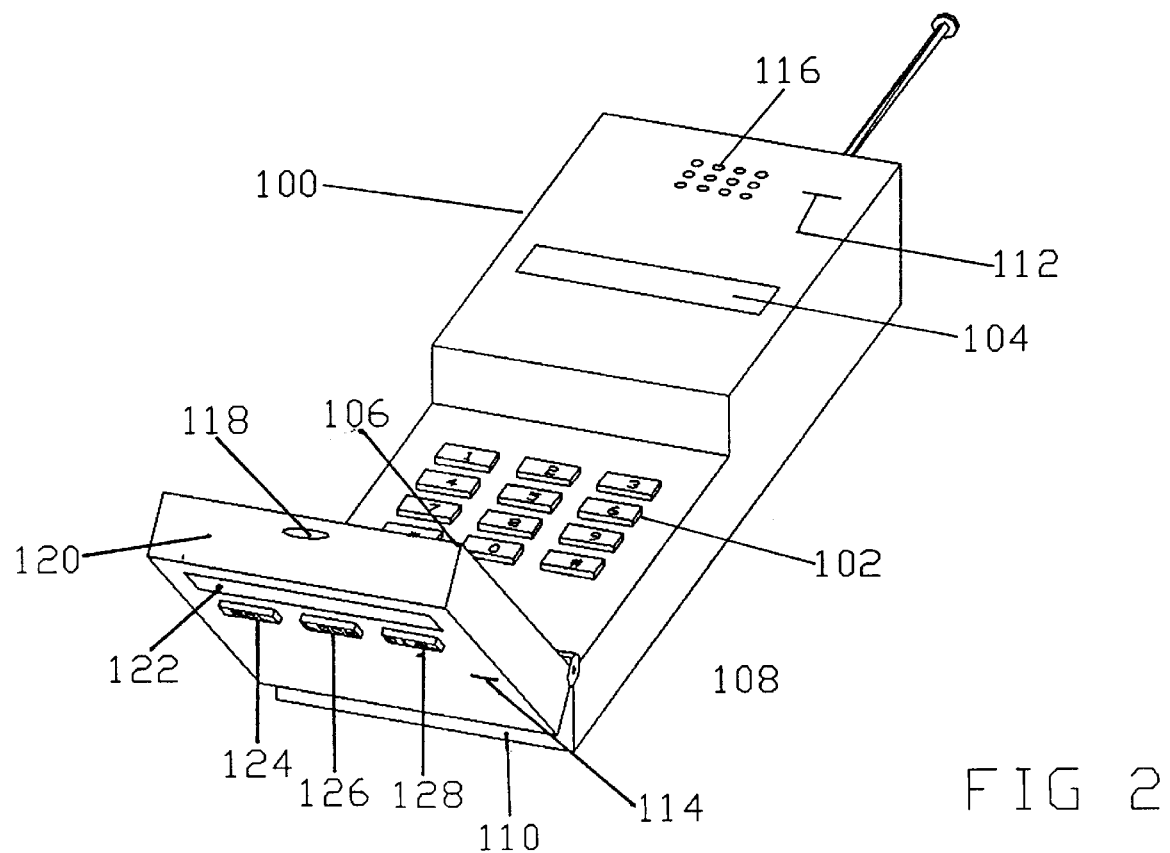
FIG. 2 is a pictorial view of a cellular telephone with a pager unit pivotally attached to one end of the telephone.

Now referring to FIG. 2 shown is an alternative embodiment of the instant invention setting forth a conventional cellular telephone 100 with a numerical key pad 102 and display screen 104. In this embodiment the paging device 106 is pivotally coupled 108 to the base 110 of the cellular telephone wherein the paging device 106 can be rotated over the numerical key pad 102 allowing the upper surface 112 of the telephone to be in the same plane as the upper surface 114 of the pager device when in the closed position. In this embodiment the cellular telephone can be used in its conventional manner wherein audio sound can be listened to through speaker screen 116 and audio sounds output through a microphone pick up similar to the location shown in FIG. 1 numeral 24 and extended by hole 118 located on the end surface 120 of the pager device 106. The pager device has a display screen 122 which allows the user to view incoming messages as well as a recall button 124, a lock button 126 and a dial button 128 all used in a similar fashion as the first embodiment. Should the telephone 100 be unnecessary for a particular use, the pager 106 can be detached from the telephone by opening the cover and then moving the pager to a side thus dislodging it from the pivot point 108.

When a page is received the pager will be either inside or outside of the cellular phone. If the pager is outside the cellular phone, the user can ignore the page until such time that the user acknowledges that a page has been received by either silencing the pager or allowing it to time out wherein a buzzing or tone noise would be discontinued. Once the user acknowledges the page, they can use the audio tone feature to return the page on a conventional telephone, not necessarily the compatible cellular phone. The pager is placed against the speaker of the telephone and by depressing the dial button, the pager will generate audio tones in direct relation to the telephone number. This eliminates the need for manually entering the phone number onto a conventional telephone as well as the compatible cellular telephone.

Should the pager be placed inside the pager compartment of the compatible cellular telephone, the user can again ignore the page when an incoming call is received as the pager has its own battery supply and thus will not drain the telephone's power pack. Further, if placement of the pager in the respective compartment of the cellular phone has occurred and an acknowledgement of the page is desired, this can be done by pressing the recall pager button which will scroll through the numbers accumulated within the pager's memory until the desired number has been located wherein the dial button can be depressed to obtain the necessary telephone audio tones corresponding to the recalled number.

Figure 3:
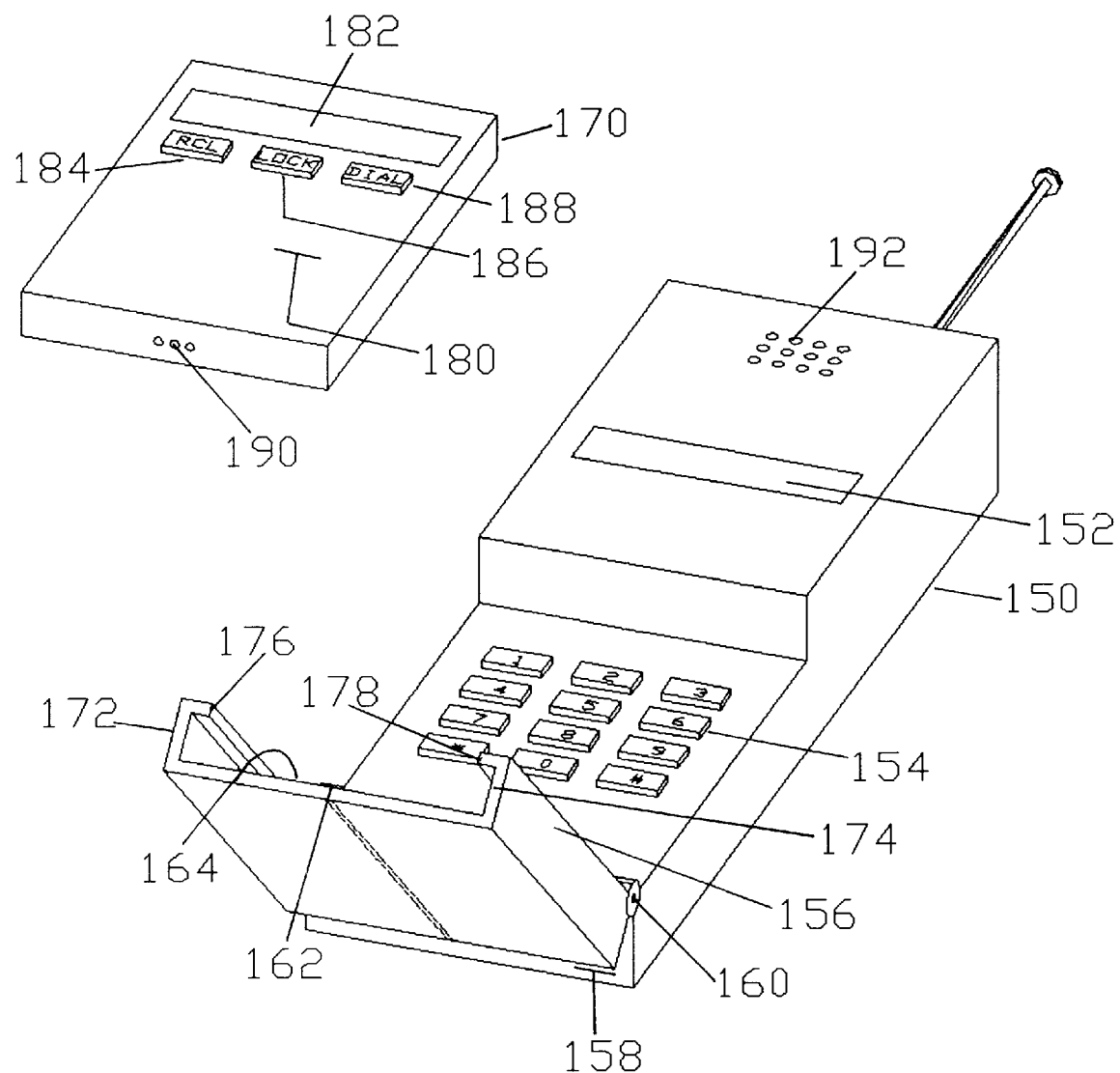
FIG. 3 is a pictorial view of a cellular telephone with a paging unit shown available for sliding into a key pad cover pivotally attached to one end of the telephone.

An alternative embodiment is illustrated by FIG. 3 wherein the key pad cover 156 is permanently mounted to the base 158 of the telephone along pivot point 160. As such, the telephone can be used in its ordinary manner wherein the key pad cover 156 is flipped open and a microphone tunnel 162 embedded into the inner side surface 164 of the key pad.

In this embodiment, pager 170 is provided which slips within the U-shaped cavity formed by the inner surface 164 having uprights 172 and 174 with inner cover tabs 176 and 178 respectively. In operation the engagement tabs 176 and 178 rest upon the surface 180 of the pager unit 170, frictionally securing the pager within the cavity and juxtapositioning the pager against side surface 164. As described in the previous embodiments, the pager includes a numerical display screen 182 together with a recall button 184, a lock button 186 and a dial button 188. The pager has its own power supply and can be used in a manner typically taught by the prior art. However, in this embodiment should the user desire to use or store the pager within the telephone device the user simply slides the pager 170 into the U-shaped opening securing the pager in the face wherein the key pad cover 156 may still be rotated into a closed position thereby concealing the pager. If a call is received and the user believes he would like to redial the number, the user simply depresses the dial switch 188 wherein a sound would be generated from speaker holes 190 in correspondence to the digital audio tones uniformly accepted with each digital number. The user can continue his conversation by listening through speaker screens 192 and speaking through microphone extension 162.

Figure 4:
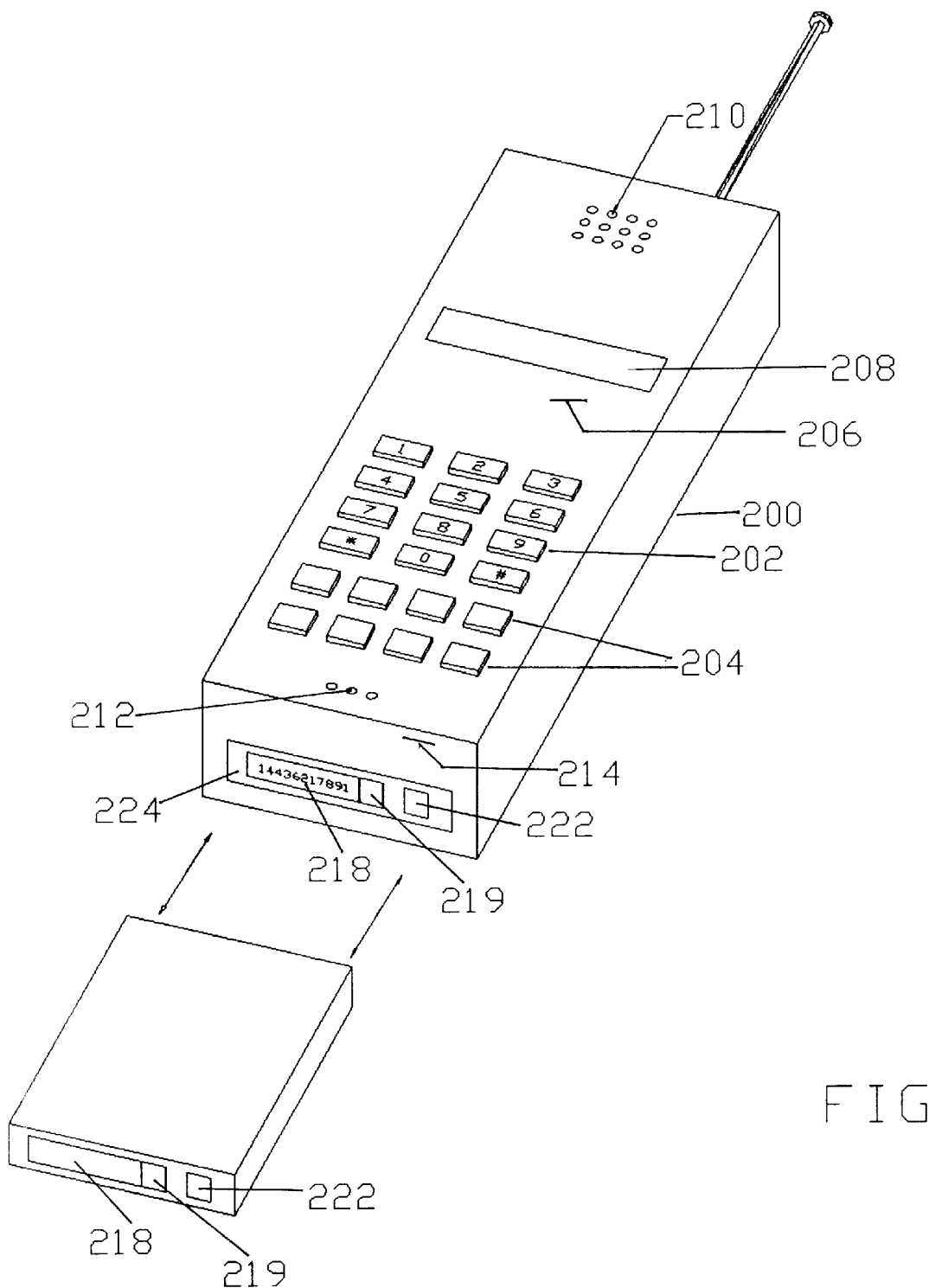
FIG. 4 is a pictorial view of a cellular telephone with a paging unit inserted and shown available for sliding into a slot located at one end of the telephone.

Now referring to FIG. 4 yet another embodiment of the instant invention is set forth wherein cellular telephone 200 includes numerical key pad 202 with function keys 204 displayed along a side surface 206 of the telephone. Display screen 208 with speaker cover 210 is located at an upper portion of the phone and microphone pick up 212 is placed along the bottom end of the phone. The cellular telephone 200 includes a cavity 224 disposed along the bottom 214 available for insertion of a pager unit 216 having the operating switches and display on one end. The pager 216 includes display 218, recall button 219 and sound button 222. In this embodiment the pager 216 can be carried in a conventional manner or inserted into the cavity 224 where its operation is similar to the aforementioned pager/telephone combinations. The combination telephone and pager works equally well with transportable telephones or fixed phones placed within a vehicle and deemed within the scope of this invention.

It is to be understood that while I have illustrated and described certain forms of the invention, it is not to be limited to the specific forms or arrangements of parts herein described and shown. It will be apparent to those skilled in the art that various changes may be made without departing from the scope of the invention and the invention is not to be considered limited to what is shown in the drawings and described in the specification.

What I claim is:

1. A combination cellular telephone and pager apparatus comprising:

a portable cellular telephone having a display screen, a send button, an audio input and output, a key pad cover having a width and a longitudinal length with a first end and a second end, said second end pivotally coupled to said telephone, said key pad cover having an inner and an outer surface with a first and second parallel spaced apart sidewalls formed perpendicular to said inner surface, each sidewall having an inwardly facing holding tab formed along a length thereof forming a U-shaped cavity, said key pad cover further including a microphone tunnel disposed along said longitudinal length, said tunnel joining said first end and said second end of said pad cover, said second end disposed over said audio input whereby a user's voice can pass uninhibited through said tunnel from said first end to said second end for receipt by said audio input;

a pager means for receiving paging signals, each signal having a telephone number with at least one digit, said pager means including a memory means for storing the received paging signals and a means for providing an indication when a paging signal has been received, said pager means being responsive to each said paging signal for reading out the received paging signal on said display screen upon recalling from said memory means, said pager means having an upper surface and a bottom surface whereby said pager means is releasably coupled to said key pad cover by insertion of said pager means into said cavity wherein said upper surface of said pager means is positioned against said inner surface of said key pad cover and said bottom surface of said pager means frictionally engages said inwardly facing holding tabs; and a means for generating an audio tone corresponding to each digit of a received telephone number;

wherein said releasable coupling facilitates transfer of said audio tones to said audio input of said cellular telephone.

2. The apparatus according to claim 1 wherein said means for generating an audio tone includes a speaker juxtapositioned to said audio input of said telephone thereby directing said generated audio tones through said speaker to said audio input.

* * * * *